(12) United States Patent
Street et al.

(10) Patent No.: US 10,309,685 B2
(45) Date of Patent: Jun. 4, 2019

(54) INTEGRATED HEATING, VENTILATION, AIR CONDITIONING, AND REFRIGERATION SYSTEM

(71) Applicant: Hussmann Corporation, Bridgeton, MO (US)

(72) Inventors: Norm E. Street, O'Fallon, MO (US); Roger J. Voorhis, Clarksville, TN (US); Doron Shapiro, St. Louis, MO (US)

(73) Assignee: Hussmann Corporation, Bridgeton, MO (US)

( * ) Notice: Subject to any disclaimer, the term of this patent is extended or adjusted under 35 U.S.C. 154(b) by 163 days.

(21) Appl. No.: 15/606,223

(22) Filed: May 26, 2017

(65) Prior Publication Data

US 2017/0261221 A1    Sep. 14, 2017

Related U.S. Application Data

(62) Division of application No. 13/702,445, filed as application No. PCT/US2011/043209 on Jul. 7, 2011, now Pat. No. 9,696,059.

(Continued)

(51) Int. Cl.
*F24F 13/10* (2006.01)
*F24F 12/00* (2006.01)
(Continued)

(52) U.S. Cl.
CPC .............. *F24F 13/10* (2013.01); *F24F 11/30* (2018.01); *F24F 12/001* (2013.01); *F25B 7/00* (2013.01);
(Continued)

(58) Field of Classification Search
CPC .......... F24F 13/10; F24F 11/30; F24F 12/001; F24F 2012/007; F25B 7/00; F25B 2400/22; Y02B 30/563
See application file for complete search history.

(56) References Cited

U.S. PATENT DOCUMENTS 2,116,100 A    5/1938 Richard
3,176,760 A    4/1965 Murdoch
(Continued)

OTHER PUBLICATIONS

International Search Report and Written Opinion dated Jan. 18, 2012 of PCT/US2011/043209, filed Jul. 11, 2011.

(Continued)

*Primary Examiner* — Emmanuel Duke
(74) *Attorney, Agent, or Firm* — Michael Best & Friedrich LLP

(57) ABSTRACT

A combined heating, ventilation, air conditioning, and refrigeration ("HVACR") system including an HVAC sub-system and a refrigeration sub-system. The HVAC sub-system is in communication with an open space of an indoor environment and includes a first condenser, a first evaporator, and a first compressor at least partially defining a first refrigerant circuit circulating a first refrigerant for selectively conditioning an airflow within the HVAC sub-system that conditions the open space. The refrigeration sub-system is in communication with an enclosed space within the indoor environment and includes a second condenser, a second evaporator, and a second compressor and at least partially defining a second refrigerant circuit circulating a second refrigerant for selectively conditioning the enclosed space. Heat from the second refrigerant is selectively transferred to the airflow within the second condenser to reheat the airflow prior to the airflow being discharged into the open space.

25 Claims, 10 Drawing Sheets

Related U.S. Application Data

(60) Provisional application No. 61/362,019, filed on Jul. 7, 2010.

(51) Int. Cl.
*F25B 7/00* (2006.01)
*F24F 11/30* (2018.01)

(52) U.S. Cl.
CPC ..... *F24F 2012/007* (2013.01); *F25B 2400/22* (2013.01); *Y02B 30/563* (2013.01)

(56) References Cited

U.S. PATENT DOCUMENTS

| | | |
|---|---|---|
| 3,185,209 A | 5/1965 | Quick |
| 4,176,525 A | 12/1979 | Tucker et al. |
| 6,272,880 B1 | 8/2001 | Miki |
| 2004/0094289 A1 | 5/2004 | Harshberger |
| 2005/0240312 A1* | 10/2005 | Terry .................. F25B 49/005 700/276 |
| 2005/0252229 A1 | 11/2005 | Moratalla |
| 2006/0122733 A1 | 6/2006 | Harrod et al. |
| 2008/0314998 A1 | 12/2008 | Herzon et al. |
| 2010/0242507 A1 | 9/2010 | Meckler |

OTHER PUBLICATIONS

PCT/US2011/043209 International Preliminary Report on Patentability dated Feb. 12, 2013 (7 pages).

\* cited by examiner

| DESCRIPTION | MODE | AIR DAMPER POSITION | | | VARIABLE SPEED BDC/ECM TYPE | | | | | |
|---|---|---|---|---|---|---|---|---|---|---|
| | | AD1 | AD2 | AD3 | PB1/CD1 | PB2/CD2 | PB3/CD3 | AC | MT | LT |
| COOLING SPACE + REFRIGERATION | 1 | 1 | 1 | 1 | ON | ON | ON | ON | ON | ON |
| HEATING THE SPACE + REFRIGERATION | 2 | 1 | 2 | 2 | ON | OFF | ON-VS | OFF | ON | ON |
| ECONOMIZER OPERATION (COOLING) + REFRIGERATION | 3 | 2 | 1 | 1 | ON | OFF | ON | OFF | ON | ON |
| COOLING MODE + SPACE EXHAUST + REFRIGERATION | 4 | 1 | 1 | 2 | ON | ON | ON | ON | ON | ON |
| COOLING MODE- DEHUMIDIFICATION + REHEAT + REFRIGERATION | 5 | 1 | 2/3 | 2/3 | ON-VS | ON | ON | ON | ON | ON |
| BUILDING EXHAUST + REFRIGERATION | 6 | 1 | 1 | 2 | OFF | ON | OFF | OFF | ON | ON |
| COMPOUND - MODE #1 (TBD) | 7 | | | | | | | | | |
| COMPOUND - MODE #2 (TBD) | 8 | | | | | | | | | |
| COMPOUND - MODE #3 (TBD) | 9 | | | | | | | | | |

FIG. 12

INTEGRATED HEATING, VENTILATION, AIR CONDITIONING, AND REFRIGERATION SYSTEM

BACKGROUND

The present invention relates to an integrated heating, ventilation, air conditioning, and refrigeration system. More particularly, the present invention relates to a system that combines various functions of the HVAC system and the refrigeration system into a single, integrated system that utilizes the refrigeration system, airflow controls, and an integrated control system 325 to condition an indoor environment.

Retail settings (e.g., retail food store applications such as grocery or convenient stores, supermarkets, or other locations) typically employ separate heating, ventilation, and air conditioning ("HVAC") and refrigeration systems to condition respective environments within the retail setting. For example, a typical retail setting may have several roof-top air-conditioners with different cooling capacities (e.g., 3 to 30 tons cooling capacity) to condition the open space within the retail setting. These rooftop units also may include electric resistance heaters for winter heating. In addition, desiccant wheel type dehumidification systems are sometimes used for dehumidifying the open space.

Often, retail settings also include one or more enclosed spaces (e.g., open or enclosed merchandisers, walk-in coolers, freezers, etc.) that must be cooled or refrigerated at temperatures that are substantially different from the desired conditions of the open space. For refrigeration loads in these enclosed spaces, two or more parallel compressor "rack" systems are often used to cool or refrigerate the enclosed spaces. Currently, the HVAC system and the refrigeration system(s) in retail settings are separate and distinct from each other, and are controlled by separate, independent control systems.

Some retail settings employ mechanical subcooling in the refrigeration system to cool refrigerant in one portion of the refrigerant circuit using the same refrigerant in another portion of the refrigerant circuit. In these retail settings, liquid refrigerant in one area of the refrigerant circuit is cooled to approximately 50 degrees Fahrenheit by refrigerant from another portion of the same refrigerant circuit before being fed to low temperature loads in the retail setting.

SUMMARY

The invention provides combined HVACR system that conditions the indoor environment by selectively using heat from the refrigeration sub-system. In particular, the HVACR system includes air dampers that regulate the direction of airflow in the HVAC sub-system such that the airflow can flow through or around the condenser assembly of the refrigeration sub-system depending on the conditioning desired for the indoor air.

In one construction, the invention provides a HVACR system that includes an HVAC sub-system and a refrigeration sub-system. The HVAC sub-system is in communication with an open space of an indoor environment and includes a first condenser, a first evaporator, and a first compressor at least partially defining a first refrigerant circuit circulating a first refrigerant for selectively conditioning an airflow within the HVAC sub-system that conditions the open space. The refrigeration sub-system is in communication with an enclosed space within the indoor environment and includes a second condenser, a second evaporator, and a second compressor and at least partially defining a second refrigerant circuit circulating a second refrigerant for selectively conditioning the enclosed space. Heat from the second refrigerant is selectively transferred to the airflow within the second condenser to reheat the airflow prior to the airflow being discharged into the open space.

In some constructions, the HVACR system includes mechanical subcooling between the HVAC sub-system and the refrigeration sub-system to cool the refrigerant in the refrigeration sub-system utilizing the refrigerant of the HVAC sub-system. In particular, the refrigerant fed to both the medium and low temperature display cases is sub-cooled by the refrigerant in the HVAC sub-system, which shifts a greater portion of the total refrigeration load to the HVAC compressor assembly.

For example, in another construction, the invention provides a HVACR system including a HVAC sub-system in communication with an open space of an indoor environment, a refrigeration sub-system in communication with a low temperature enclosed space and a medium temperature enclosed space, and subcooling apparatus. The HVAC sub-system includes a first condenser, a first evaporator, and a first compressor arranged in series with each other and at least partially defining a first refrigerant circuit circulating a first refrigerant for selectively conditioning an airflow within the HVAC sub-system that is directed to the indoor environment to condition the open space. The refrigeration sub-system includes a second condenser, a second evaporator, and a second compressor arranged in series with each other and at least partially defining a second refrigerant circuit circulating a second refrigerant for selectively conditioning the low temperature enclosed space and the medium temperature enclosed space. The subcooling apparatus is positioned between and is in fluid communication with the first refrigerant circuit and the second refrigerant circuit such that the second refrigerant is cooled via heat exchange relationship with the first refrigerant prior to the second refrigerant conditioning the low temperature enclosed space and the medium temperature enclosed space.

The invention also provides an integrated control system that controls the functions and operations of the HVAC sub-system and the refrigeration sub-system. The control system includes a unitary electronic controller that has control algorithms to manage functions of the HVAC sub-system and the refrigeration sub-system to more precisely coordinate and combine the control of both systems.

The invention also provides modular apparatus that integrates the interchange of energy between the HVAC sub-system and the refrigeration sub-system by locating different sections of the respective sub-systems adjacent each other and incorporating an air damper system to coordinate airflow through the sections. In particular, the HVACR system includes an evaporator section, a condenser assembly section, and an air damper system that selectively directs airflow through the respective sections. The evaporator and condenser assembly sections are located in close proximity to each other to maximize the effect of the integrated airflow between the two sections. In some constructions, a compressor assembly section can be located in close proximity to the evaporator and condenser assembly sections.

For example, in one construction, the invention provides a HVACR system including a modular evaporator in communication with an open space of an indoor environment, a modular condenser section selectively in communication with the indoor environment and an ambient environment, and an air damper system. The evaporator section has an evaporator and a first air moving device positioned to direct air through the evaporator and toward the open space. The condenser section has a condenser and a second air moving device positioned to direct air through the condenser. The air damper system has a plurality of air dampers positioned to control airflow between the indoor environment, the ambient environment, and the evaporator section and the condenser section.

In another construction, the invention provides a HVACR system including a HVAC sub-system in communication with an open space of an indoor environment, a refrigeration sub-system in communication with an enclosed space within the indoor environment, and a modular condenser section in communication with an ambient environment. The HVAC sub-system has a first condenser partially defining a first refrigerant circuit circulating a first refrigerant for selectively conditioning the open space. The refrigeration sub-system has a second condenser partially defining a second refrigerant circuit different from the first refrigerant circuit and circulating a second refrigerant for selectively conditioning the enclosed space. The condenser section supports the first condenser and the second condenser proximate to each other, and has an air moving device that is positioned to direct an airflow through one or both of the first condenser and the second condenser.

Other aspects of the invention will become apparent by consideration of the detailed description and accompanying drawings.

BRIEF DESCRIPTION OF THE DRAWINGS

FIG. 12 is a table illustrating a plurality of operating modes embodied by the HVACR system of FIGS. 1 and 5-7.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
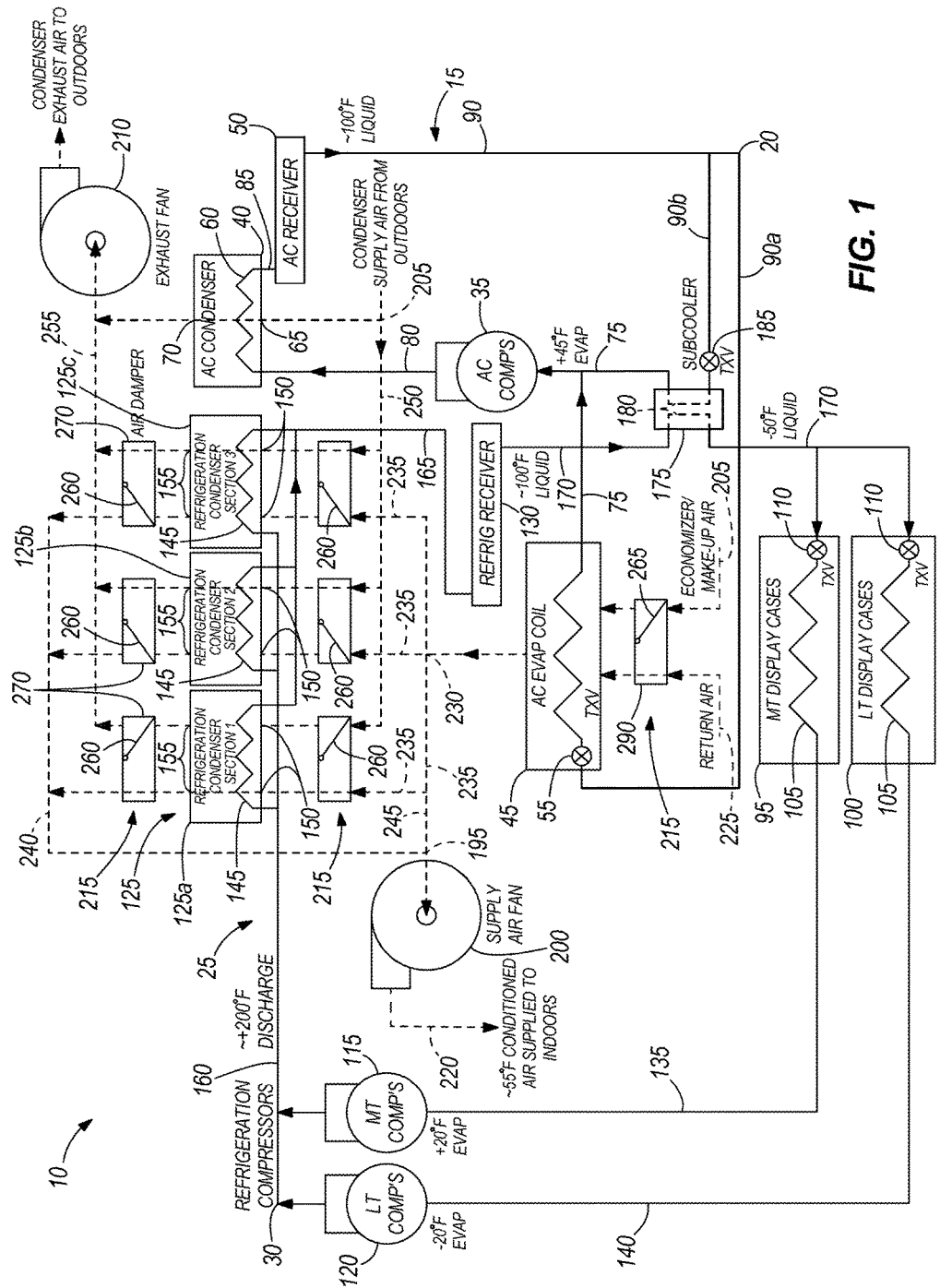
FIG. 1 is a schematic view of one construction of an integrated heating, ventilation, and air conditioning system and a refrigeration system ("HVACR system") embodying the invention.

FIG. 1 shows an integrated heating, ventilation, and air conditioning ("HVAC") and refrigeration system 10 that is used in a commercial setting (e.g., a retail store, supermarket, or an industrial setting) or other settings that have temperature-controlled environments. For example, the HVAC and refrigeration ("HVACR") system 10 may be used in the commercial setting to condition an interior or open space or indoor environment (e.g., a commonly accessible area including retail space where customers may browse items for sale) and one or more enclosed spaces (e.g., product display areas of merchandisers or display cases) of the commercial setting. The open space and the enclosed spaces are temperature controlled environments within the commercial setting.

FIG. 1 shows that the HVACR system 10 includes a HVAC sub-system 15 that defines a first refrigerant circuit 20, and a refrigeration sub-system 25 that defines a second refrigerant circuit 30. The HVAC sub-system 15 is in communication with the indoor environment to control the temperature and humidity, and includes a compressor assembly 35 that has one or more compressors 37 for compressing refrigerant in the first refrigerant circuit 20, a first condenser assembly 40 for cooling the refrigerant, an evaporator 45 in communication with the indoor environment, a first receiver 50, and a thermal expansion valve 55 positioned on an upstream side of the evaporator 45. As one of ordinary skill in the art will appreciate, the quantity of components in the HVAC sub-system 15 (e.g., compressors, condensers, evaporators, receivers, valves, etc.) can vary depending on the desired characteristics of the HVAC sub-system 15 and the conditioning needs of the commercial setting.

The first condenser assembly 40 includes one or more condensers each having a condenser coil 60, an air inlet 65, and an air outlet 70 such that ambient air can flow over the associated condenser coil 60 to cool refrigerant in the first refrigerant circuit 20. In some constructions, the first condenser assembly 40 is located on a rooftop of the commercial setting to discharge energy from the refrigerant in the first refrigerant circuit 20 to the surrounding environment.

The HVAC sub-system 15 further includes a suction main 75, a discharge main 80, a receiver line 85, and a fluid main 90. The suction main 75 is in fluid communication with the evaporator 45 and an inlet to the compressor assembly 35 to direct the refrigerant from the evaporator 45 to the compressors 37. The discharge main 80 is in fluid communication with the compressor assembly 35 and the first condenser assembly 40 to direct the compressed refrigerant to the condensers 42. The receiver line 85 is in communication with the first condenser assembly 40 and the first receiver 50 to direct cooled refrigerant to the first receiver 50.

The fluid main 90 is in fluid communication with the first receiver 50, an inlet to the evaporator 45, and the inlet to the compressor assembly 35 to direct the refrigerant to the evaporator 45 and the compressor assembly 35. In particular, the fluid main 90 is sub-divided into two portions for directing cooled refrigerant to the evaporator 45 and the compressor assembly 35. A first portion 90a is in fluid communication with the first receiver 50 and the evaporator 45. A second portion 90b is in fluid communication with the first receiver 50 and the compressor assembly 35.

The refrigeration sub-system 25 is in communication with the enclosed spaces to control the temperature and humidity of the corresponding product display areas. The refrigeration sub-system 25 is adapted to be used in any of a variety of configurations (e.g., refrigerated display case, refrigerated merchandiser freezer, cooler, temperature-controlled storage, etc.), and includes a refrigerant in heat transfer relationship with a fluid to condition the enclosed spaces. In the illustrated construction, the refrigeration sub-system 25 can include one or more medium temperature display cases 95 and one or more low temperature display cases 100 arranged in parallel relationship with each other within the second refrigerant circuit 30. The quantity of medium and low temperature display cases 95, 100 can vary depending on the desired characteristics of the HVACR system 10 and the refrigeration needs of the commercial setting.

Each of the medium and low temperature display cases 95, 100 includes an evaporator 105 in heat exchange relationship with an airflow that conditions the corresponding enclosed space. A thermal expansion valve 110 is positioned on an upstream side of each of the medium and low temperature display cases 95, 100.

The refrigeration sub-system 25 also includes a medium temperature compressor assembly 115, a low temperature compressor assembly 120, a second condenser assembly 125, and a second receiver 130. The medium temperature compressor assembly 115 can include one or more compressors, and is associated and in communication with each of the medium temperature display cases 95 via a first suction main 135. The low temperature compressor assembly 120 can include one or more compressors, and is associated and in fluid communication with each of the low temperature display cases 100 via a second suction main 140.

In the illustrated construction, the second condenser assembly 125 includes three condensers 125a, 125b, 125c arranged in parallel with each other, although other quantities of condensers are possible and considered herein. Each condenser 125a, 125b, 125c includes a condenser coil 145, an air inlet 150, and an air outlet 155 such that ambient air can flow over the associated condenser coil 145 to cool refrigerant in the second refrigerant circuit 30. In some constructions, the second condenser assembly 125 is located on a rooftop of the commercial setting to discharge energy from the refrigerant in the second refrigerant circuit 30 to the outside environment.

The refrigeration sub-system 25 also includes a discharge main 160, a receiver line 165, and a fluid main 170. The discharge main 160 is in fluid communication with the medium and low temperature compressor assemblies 115, 120 to direct the compressed refrigerant to the second condenser assembly 125. The receiver line 165 is in fluid communication with the condenser assembly 125 and the second receiver 130 to direct cooled refrigerant from the condensers 125a, 125b, 125c to the second receiver 130. The fluid main 170 is in fluid communication with the second receiver 130 and the medium and low temperature display cases 95, 100 to direct cooled refrigerant to the respective evaporators 105.

As illustrated in FIG. 1, the first refrigerant circuit 20 and the second refrigerant circuit 30 are separate, distinct refrigerant circuits that can circulate the same or different refrigerants. The refrigerant in the first refrigerant circuit 20 and the second refrigerant circuit 30 can be any suitable refrigerant for conditioning the open and enclosed spaces. For example, the refrigerant may include a glide refrigerant (e.g., a high glide refrigerant) to achieve a lower approach temperature between the refrigerant and the air with which the refrigerant is in heat transfer relationship. In other constructions, one or both of the first refrigerant circuit 20 and the second refrigerant circuit 30 can include a sin0067le component refrigerant.

The HVACR system 10 also includes subcooling apparatus 175 positioned between the first refrigerant circuit 20 and the second refrigerant circuit 30 in the respective fluid mains 90, 170. The subcooling apparatus 175 includes a heat exchanger 180 that is in fluid communication with the first refrigerant circuit 20 downstream of the first receiver 50 and upstream of the compressor assembly 35. An expansion valve 185 is located in the first refrigerant circuit 20 adjacent an inlet to the heat exchanger 180. The heat exchanger 180 is further separately in fluid communication with the second refrigerant circuit 30 downstream of the second receiver 130 and upstream of the medium and low temperature display cases 95, 100. Thus, the refrigerant in the second refrigerant circuit 30 is additionally cooled by heat exchange with the refrigerant in the first refrigerant circuit 20 before the refrigerant in the second refrigerant circuit 30 enters the medium and low temperature display cases 95, 100.

The HVACR system 10 further includes an airflow management system in communication with the HVAC sub-system 15 and the refrigeration sub-system 25. The airflow management system includes a first airflow circuit 195 that is in communication with the indoor environment to condition the air in the open space, a supply blower 200 (e.g., one or more fans) in communication with the first airflow circuit 195, a second airflow circuit 205, an exhaust blower 210 in communication with the second airflow circuit 205, and an air damper system 215.

As illustrated in FIG. 1, the first airflow circuit 195 is an air conditioning circuit defined by a supply air section 220 in communication with the indoor environment, a return air section 225 in communication with the open space, and an air conditioning section 230 in communication with the supply air section 220 and the return air section 225. The supply air section 220 is in fluid communication between the air conditioning section 225 and the indoor environment to direct conditioned air into the indoor environment. The supply blower 200 is located in or adjacent the supply air section 220 to generate the airflow toward the indoor environment.

The return air section 225 is in fluid communication between the indoor environment and the air conditioning section 230 to direct return air from the indoor environment to the air conditioning section 230 for recycling through the first airflow circuit 195. In some constructions, a blower (not shown) can be positioned in the return air section 225 to generate airflow from the open space to the air conditioning section 230.

Figure 2:
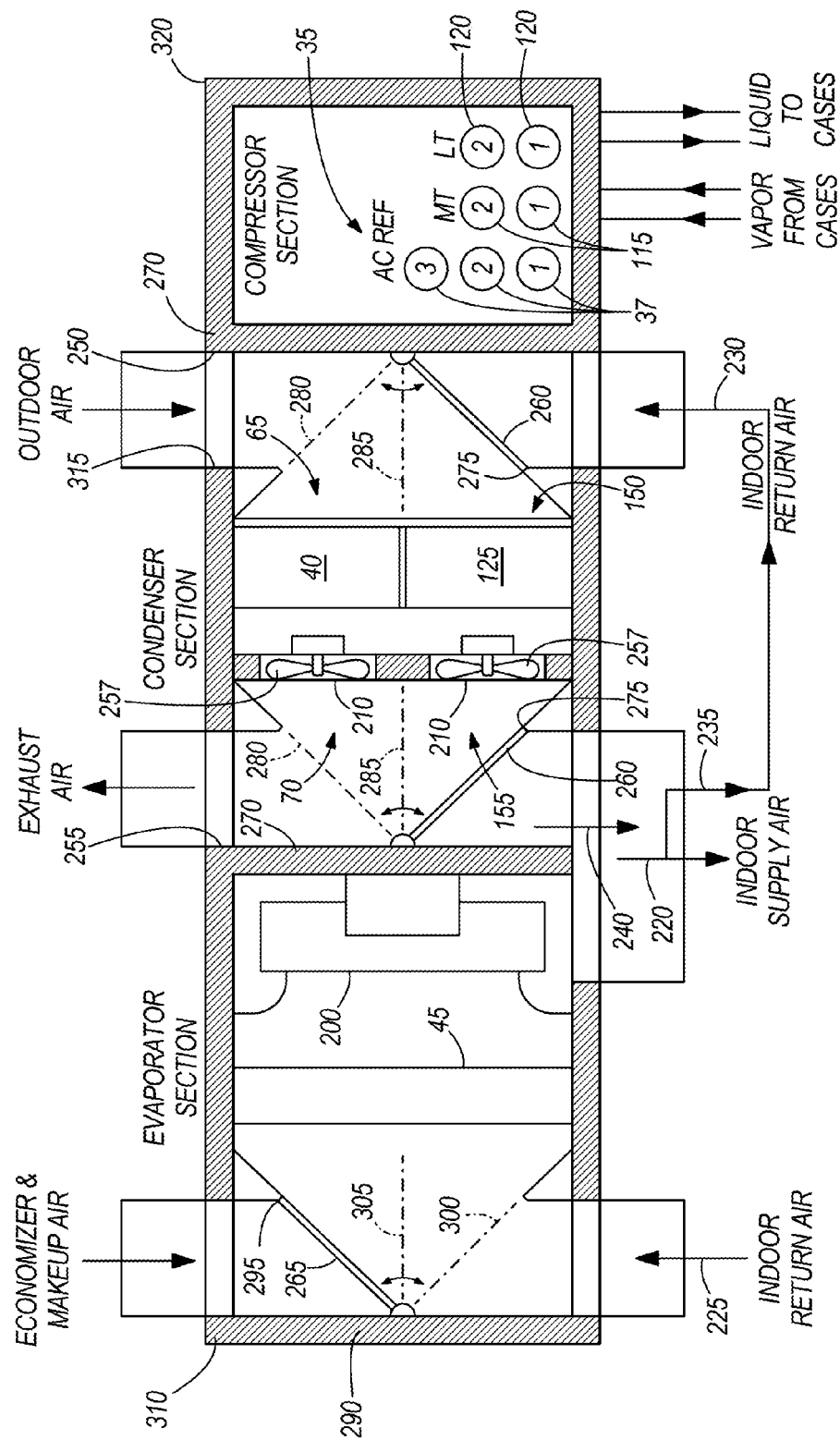
FIG. 2 is a plan view of a portion of another construction of the HVACR system of FIG. 1.
Figure 3:
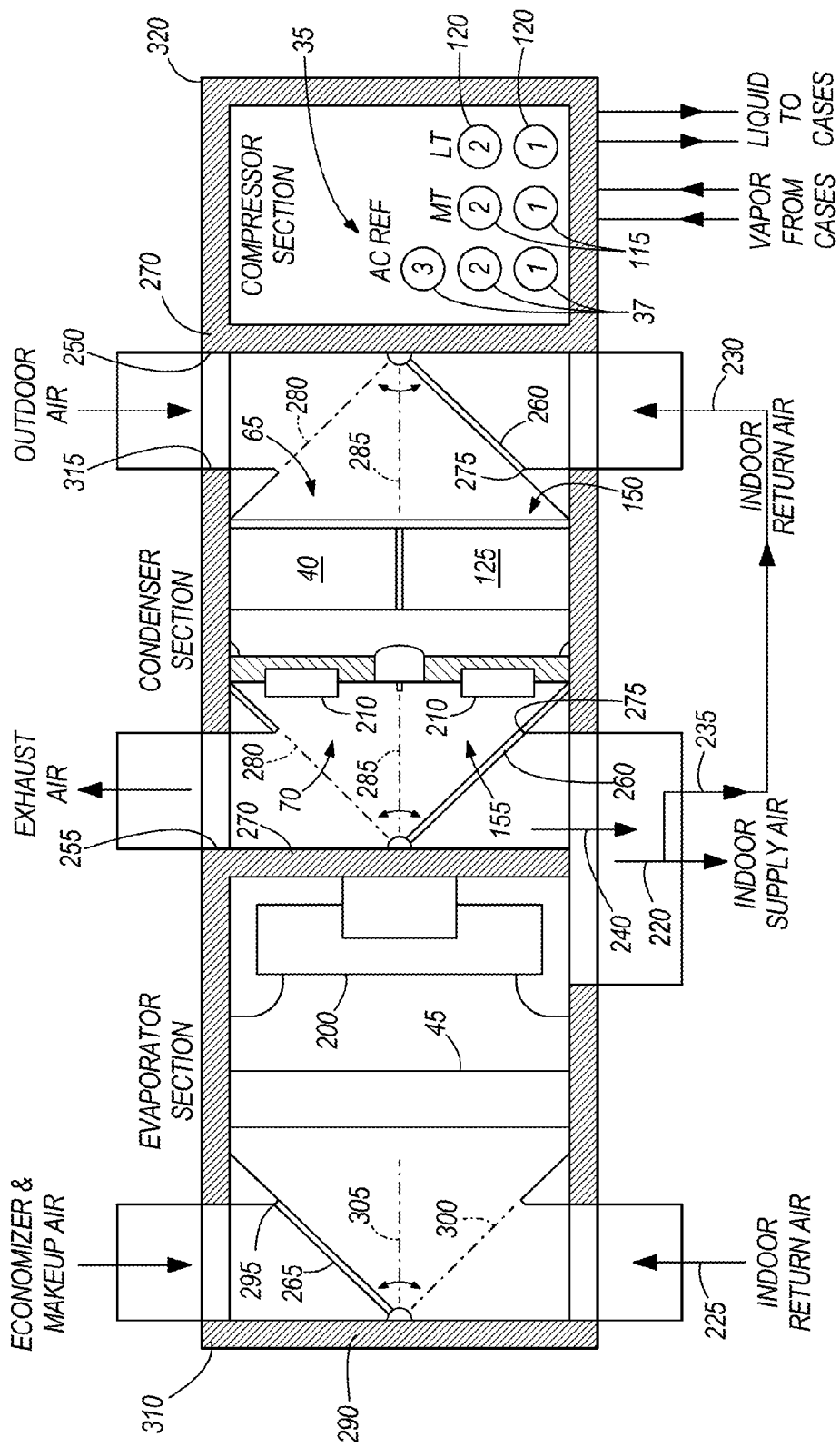
FIG. 3 is a plan view of a portion of another construction of the HVACR system of FIG. 1.

The air conditioning section 230 includes an inlet portion 235, outlet portion 240, and bypass portion 245. The inlet portion 235 is fluidly coupled between the return air section 225 and the air inlet 150 to the second condenser assembly 125 on a downstream side of the evaporator 45. The outlet portion 240 is fluidly coupled between the air outlet 155 of the second condenser assembly 125 and the supply air section 220. The bypass portion 245 is fluidly coupled between the inlet portion 235 and the supply air section 220. As illustrated in FIGS. 2 and 3, the inlet portion 235 and the outlet portion 240 also can be in communication with the first condenser assembly 40.

The second airflow circuit 205 is a heat rejection circuit defined by an ambient air inlet 250 and an ambient air outlet 255 that is in communication with the outside environment. The ambient air inlet 250 is in fluid communication with the air inlets 65, 150 of the first and second condenser assemblies 40, 125. The ambient air outlet 255 is in fluid communication with the air outlets 70, 155 of the first and second condenser assemblies 40, 125. The exhaust blower 210 is in communication with the ambient air outlet 255 to circulate air from the outside environment through the first and second condenser assemblies 40, 125 via the ambient air inlet 250, and back to the outside environment via the ambient air outlet 250. As illustrated in FIG. 3, the exhaust blower 210 can include plenum blowers. Alternatively, as illustrated in FIG. 2, the exhaust blower 210 can include fans 257.

As shown in FIGS. 1-3, the air damper system 215 includes first air dampers 260 located adjacent the first and second condenser assembly 125, and a second air damper 265 located adjacent the evaporator 45. In some constructions, the air damper system 215 may only include the first air dampers 260.

The first air dampers 260 are in communication with the first and second airflow circuits 195, 205 to selectively direct air from one or both of the first and second airflow circuits 195, 205 through the second condenser assembly 125. In the HVACR system 10 illustrated in FIG. 1, the second airflow circuit 205 is always in communication with the first condenser assembly 40 (i.e., no air damper is located adjacent the first condenser assembly 40). In other constructions, the second airflow circuit 205 can be in selective communication with the first condenser assembly 40 using an air damper. For example, FIGS. 2 and 3 show one first air damper 260 located adjacent the first and second condenser assemblies 40, 125.

The first air dampers 260 are arranged in pairs relative to the respective condensers 125a, 125b, 125c, with one first air damper 260 located adjacent the air inlets 150 of the respective condensers 125a, 125b, 125c, and one first air damper 260 located adjacent the air outlets 155. Each first air damper 260 is in fluid communication with the first airflow circuit 195 and the second airflow circuit 205. As shown in FIGS. 1-3, each first air damper 260 is pivotably attached to a partition or housing 270, and is pivotably movable between a first position 275 and a second position 280 to selectively permit air from one of the first and second airflow circuits 195, 205 to flow through the associated condenser 125a, 125b, 125c.

In some constructions, the first air dampers 260 can be positioned in either the first position 275 or the second position 280 to control the airflow through the second condenser assembly 125 (i.e., step-wise movable between the first position 275 and the second position 280). As illustrated in FIGS. 2 and 3, the first air dampers 260 can be in the first position 275, the second position 280, or one or more third positions 285 between the first and second positions 275, 280. In the latter construction, the first air dampers 260 can be continuously or step-wise varied between the first position 275, the second position 280, and the third position 285 between the first and second positions 275, 280. Generally, the third position 285 corresponds to any intermediate position between the first position 275 and the second position 280.

In the illustrated construction, the first position 275 of the first air dampers 260 corresponds to the associated condenser 125a, 125b, 125c being in fluid communication with the second airflow circuit 205. The second position 280 of the first air dampers 260 corresponds to the associated condenser 125a, 125b, 125c being in fluid communication with the first airflow circuit 195. The third position 285 of the first air dampers 260 corresponds to the associated condenser 125a, 125b, 125c being in fluid communication with both the first and second airflow circuits 195, 205.

The first air dampers 260 adjacent the air inlet 150 and the air outlet 155 of a particular condenser (i.e., first air damper pairs) cooperatively fluidly couple and fluidly decouple the condenser relative to the first airflow circuit 195 and relative to the second airflow circuit 205. Various combinations of damper positions for the first air dampers 260 are possible to provide the desired airflow within the HVACR system 10. Generally, the position of the first air dampers 260 is based on the desired air conditioning in the HVACR system 10, and the first air dampers 260 of particular damper pairs can be in the same or different position relative to the first air dampers 260 of other damper pairs. In some constructions, the first air dampers 260 of a particular damper pair are in the same position (e.g., the first position 275, the second position 280, or the third position 285) so the air from one airflow circuit (e.g., the first airflow circuit 195 or the second airflow circuit 205) is not redirected to the other airflow circuit (e.g., the second airflow circuit 205 or the first airflow circuit 195). In other constructions, the first air dampers 260 of a particular damper pair can have the same or different positions (e.g., the first position 275, the second position 280, or the third position 285) such that air from different sources (e.g., the first airflow circuit 195 and the second airflow circuit 205) is partially mixed together within the second condenser assembly 125.

The second air damper 265 is located adjacent the inlet of the evaporator 45. The second air damper 265 is in fluid communication with the first airflow circuit 195 and another airflow circuit (e.g., the second airflow circuit 205) to selectively direct air from either or both of the first airflow circuit 195 and the other airflow circuit through the evaporator 45. As shown in FIGS. 1-3, the second air damper 265 is pivotably attached to a partition or housing 290, and is pivotably movable between a first position 295, a second position 300, and a third position 305 to selectively control the airflow through the evaporator 45 (e.g., step-wise movable between the first position 295, the second position 300, and the third position 305, continuously variable between the first, second, and third positions 295, 300, 305, etc.). Various positions for the second air dampers 265 are possible to provide the desired airflow within the HVACR system 10.

The second air damper 265 fluidly couples and decouples the evaporator 45 relative to the first airflow circuit 195 and relative to the second airflow circuit 205. In the illustrated construction, the first position 295 of the second air damper 265 corresponds to the evaporator 45 being in fluid communication with the first airflow circuit 195. The second position 300 of the second air damper 265 corresponds to the evaporator 45 being in fluid communication with the second airflow circuit 205 such that no air from the return air section 225 flows through the evaporator 45. The third position 305 of the second air damper 265 corresponds to the evaporator 45 being in fluid communication with both the first airflow circuit 195 and the second airflow circuit 205. In other constructions, the HVACR system may be without the second air damper 265 such that air in the return air section always flows through the evaporator 45.

FIGS. 2 and 3 show a portion of the HVACR system 10 with regard to arrangement of various components of the HVAC sub-system 15 and the refrigeration sub-system 25. At least some portions of the HVACR system 10 are modular and can be packaged as a unit that can be located on the roof of the commercial setting, or in other areas of the commercial setting (e.g., equipment room). For example, the HVACR system 10 illustrated in FIGS. 2 and 3 includes three modular sections—an evaporator section 310, a condenser assembly section 315, and a compressor assembly section 320. Any combination of these sections can be located next to or remote from the other sections. For example, the evaporator and condenser assembly sections 310, 315 can be located remotely from the compressor assembly section 320 (e.g., the compressor assembly section 320 can be located in an equipment room and the evaporator and condenser assembly sections 310, 315 can be located on the roof or outside the building to position the first and second airflow circuits 195, 205 in close proximity to each other (e.g., for ease of airflow routing, etc.). The first and second air dampers 260, 265 are located within or adjacent the condenser assembly section 315 and the evaporator section 310, respectively, to control airflow through these sections. The different directions of airflow that are possible within the HVACR system 10 are depicted by arrows in FIGS. 2 and 3.

Figure 4:
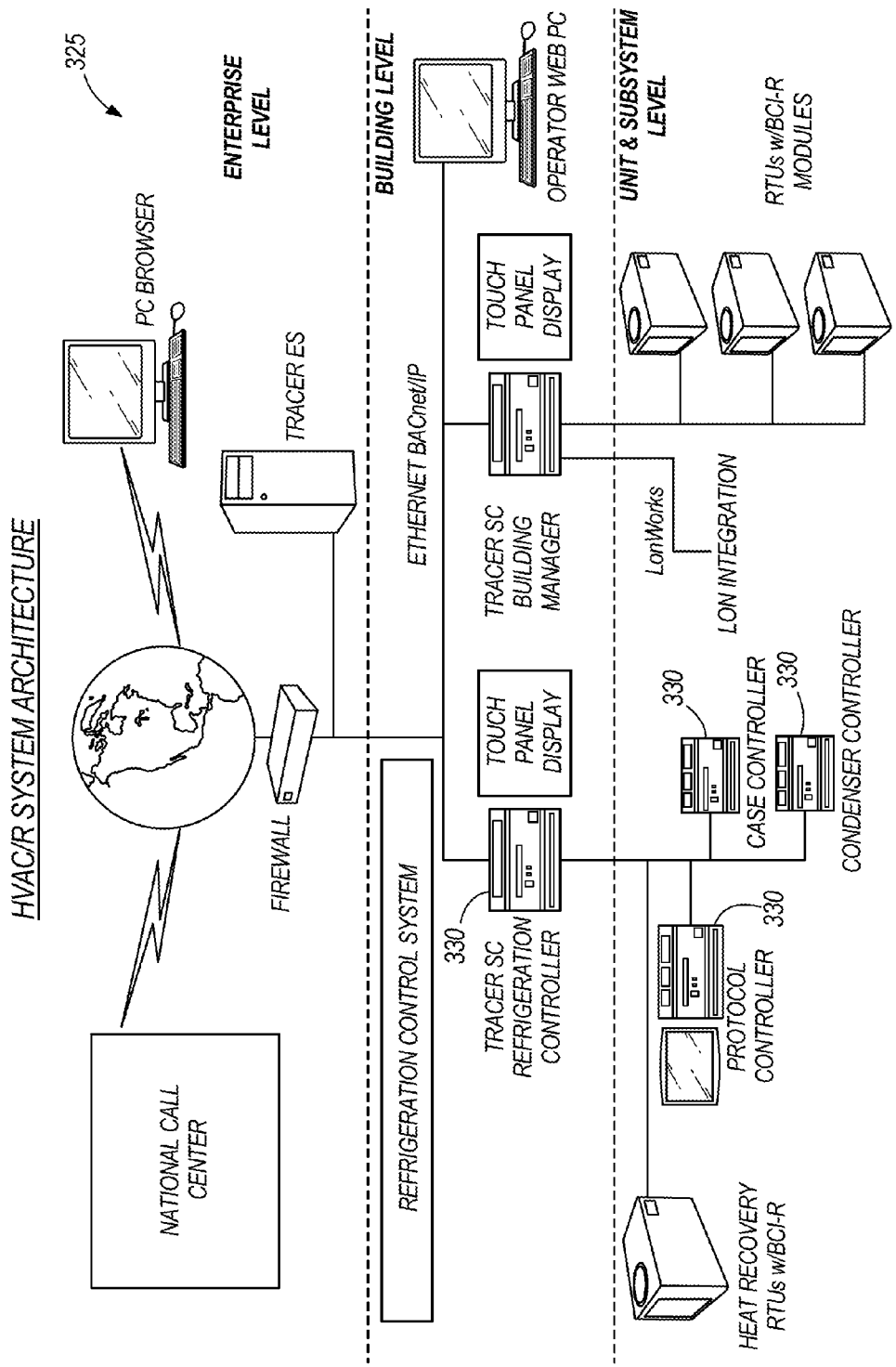
FIG. 4 is a schematic view of a control system for the HVACR system of FIG. 1.

The HVACR system 10 also includes an integrated, unitary control system 325 for controlling the HVAC sub-system 15 and the refrigeration sub-system 25. As illustrated in FIG. 4, the control system 325 cooperates with a full enterprise system and with autonomous discrete level control and every control point in the spectrum between the full enterprise system and autonomous control.

The control system 325 includes controllers 330 that have one or more algorithms for combined control of the HVAC sub-system 15 and the refrigeration sub-system 25 (e.g., evaluate conditions of HVAC sub-system 15 and the refrigeration sub-system 25, positions of the first and second air dampers 260, 265, status of the compressor assemblies 35, 115, 120, speed of the blowers 200, 210, etc.) to maintain the open and enclosed spaces of the commercial setting at desired conditions. The control system 325 is in communication with various components of the HVACR system 10 to control operation of the first and second refrigerant circuits 20, 30, and airflow within the first and second airflow circuits 195, 205. The airflow control provided by the control system 325 includes utilizing different combinations of air (e.g., makeup air, reheat air, ambient air, etc.) to control the conditions in the indoor environment and the product display areas.

Figure 5:
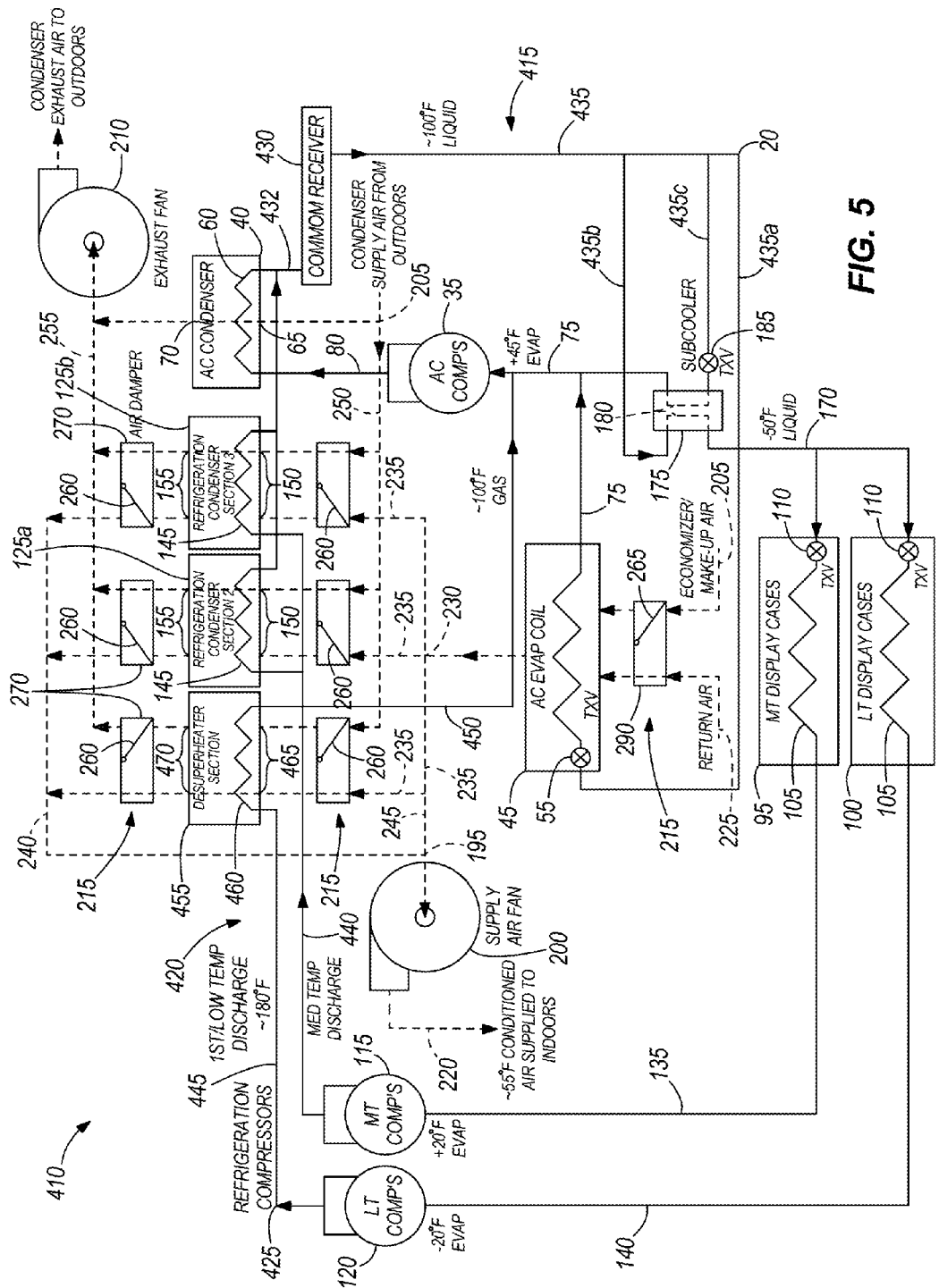
FIG. 5 is a schematic view of another construction of an integrated HVACR system embodying the invention.

FIG. 5 shows another construction of an HVACR system 410 for use with a commercial setting and embodying the invention. Except as described below, the HVACR system 410 is the same as the HVACR system 10 described with regard to FIG. 1, and common elements are given the same reference numerals.

The HVACR system 410 is a two-stage system including a HVAC sub-system 415 and a refrigeration sub-system 420 defining one refrigerant circuit 425. The HVACR system 410 includes the compressor assembly 35, the first condenser assembly 40, the evaporator 45, the second condenser assembly 125, the medium temperature display cases 95, the low temperature display cases 100, the medium temperature compressor assembly 115, the low temperature compressor assembly 120, the subcooling apparatus 175, the airflow management system, a receiver 430, and a receiver line 432. In the illustrated construction, the second condenser assembly 125 includes two condensers 125a, 125b arranged in parallel with each other, although other quantities of condensers are possible and considered herein. The receiver 430 is in fluid communication with the first condenser assembly 40 and the second condenser assembly 125 to receive and store refrigerant in the refrigeration circuit 425.

The HVACR system 410 also includes a fluid main 435, a first discharge main 440, a second discharge main 445, a desuperheater line 450, and a desuperheater 455. The fluid main 435 is sub-divided into three portions for directing cooled refrigerant to different components. A first portion 435a is in fluid communication with the receiver 430 and the evaporator 45 to direct refrigerant to the evaporator 45. A second portion 435b is in fluid communication with the receiver 430 and the subcooling apparatus 175 to direct refrigerant through the heat exchanger 180 and then to the medium and low temperature display cases 95, 100. A third portion 435c is in fluid communication with the receiver 430 and the subcooling apparatus 175 to direct refrigerant through the heat exchanger 180 and then to the compressor assembly 35.

As shown in FIG. 5, the heat exchanger 180 is separately in fluid communication with the second and third portions 435b, 435c of the fluid main 435 downstream of the receiver 430, and upstream of the compressor assembly 35 and the medium and low temperature display cases 95, 100. In particular, the second portion of the fluid main 435 is in heat exchange relationship with the third portion 435c to additionally cool the refrigerant in the second portion 435b via heat exchange relationship prior to the refrigerant in the second portion 435b being directed to the medium and low temperature display cases 95, 100.

The first discharge main 440 is in fluid communication with the medium temperature compressor assembly 115 to direct compressed refrigerant to the second condenser assembly 125. The second discharge main 445 is in fluid communication with the low temperature compressor assembly 120 to direct compressed refrigerant to the desuperheater 455.

The desuperheater 455 is positioned adjacent the second condenser assembly 125 and is in fluid communication with the compressor assembly 35 and the low temperature compressor assembly 120 to cool the refrigerant prior to the refrigerant being directed via the desuperheater line 450 to the suction main 75 of the compressor assembly 35. The desuperheater 455 includes a refrigerant coil 460, an air inlet 465, and an air outlet 470 such that air can flow over the refrigerant coil 460 to cool refrigerant in the desuperheater 455. As one of ordinary skill in the art will recognize, the desuperheater 455 functions similar to the condensers 125a, 125b, and the refrigerant cooled in the desuperheater 455 is directed to the suction main 75 to partially cool the refrigerant entering the compressor assembly 35.

The air damper system 215 is positioned adjacent the second condenser assembly 125 and the desuperheater 455. The air damper system 215 is in communication with the first and second airflow circuits 195, 205 to selectively direct air from one or both of the first and second airflow circuits 195, 205 through the second condenser assembly 125 and the desuperheater 455. As illustrated in FIG. 5, the second airflow circuit 205 is always in communication with the first condenser assembly 40 (i.e., no air damper is located adjacent the first condenser assembly 40). In other constructions, the second airflow circuit 205 can be in selective communication with the first condenser assembly 40 using an air damper.

Figure 6:
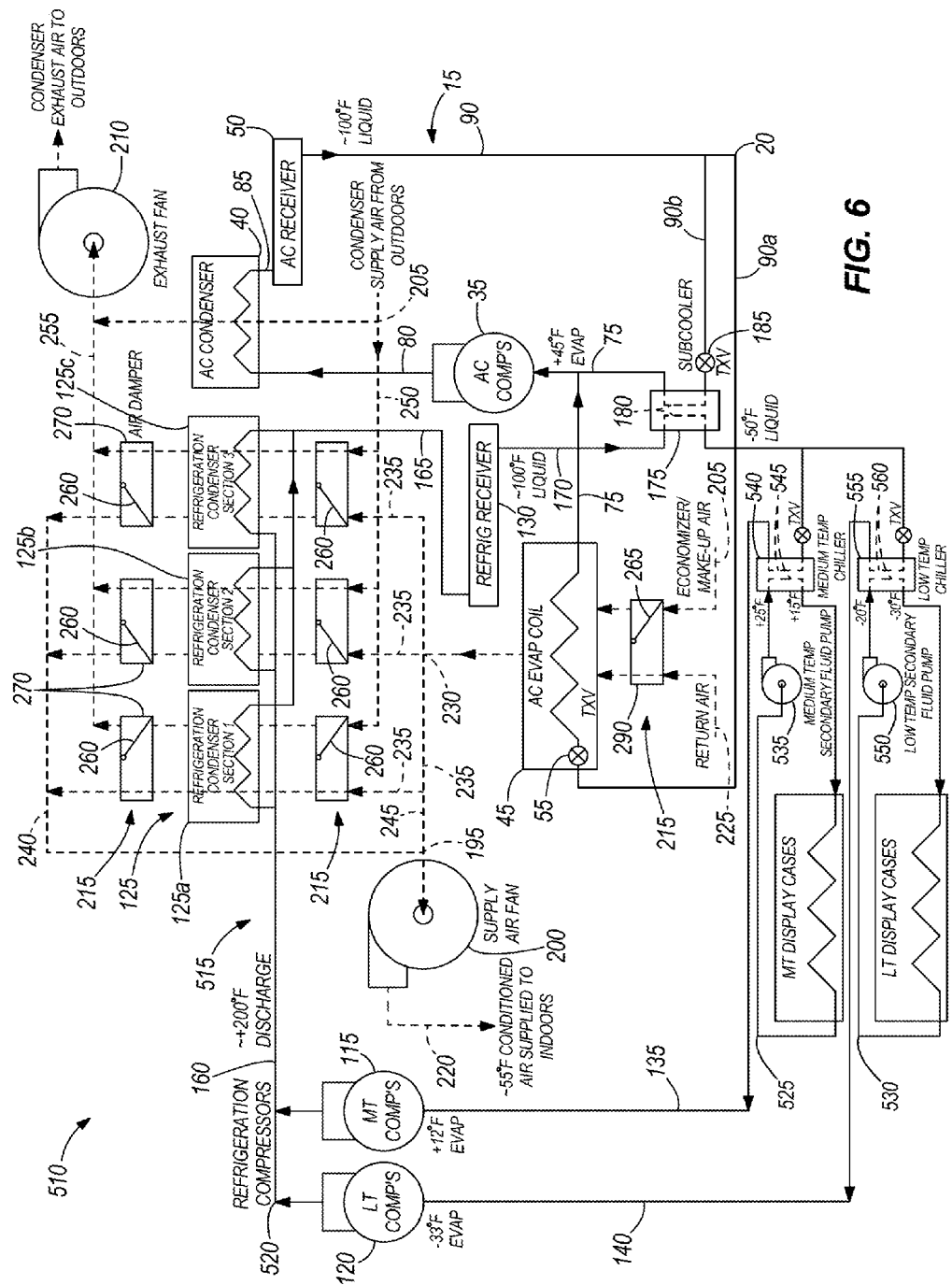
FIG. 6 is a schematic view of another construction of an integrated HVACR system embodying the invention.

FIG. 6 shows another construction of an HVACR system 510 for use with a commercial setting and embodying the invention. Except as described below, the HVACR system 510 is the same as the HVACR system 10 described with regard to FIG. 1, and common elements are given the same reference numerals.

As illustrated in FIG. 6, the HVACR system 510 includes the HVAC sub-system 15 and a refrigeration sub-system 515. The refrigeration sub-system 515 is the similar to the refrigeration sub-system 25 described with regard to FIG. 1, except the refrigeration sub-system 515 defines a modified second refrigerant circuit 520 and includes a medium temperature secondary fluid loop 525 and a low temperature secondary fluid loop 530 (e.g., chilled water or glycol loops) associated with the medium temperature display cases 95 and the low temperature display cases 100, respectively.

The refrigerant in the second refrigerant circuit 520 illustrated in FIG. 6 does not flow through the medium and low temperature display cases 95, 100. Instead, the medium and low temperature secondary fluid loops 525, 530 define coolant loops that are separate from and in heat exchange relationship with the second refrigerant circuit 520. The medium and low temperature secondary fluid loops 525, 530 are further separate or isolated from each other. The medium temperature secondary fluid loop 525 includes the medium temperature display cases 95, a first pump 535, and a first chiller 540. The first pump 535 is positioned in the secondary fluid loop 525 to direct refrigerant between the medium temperature display cases 95 and the first chiller 540. The first chiller 540 includes a heat exchanger 545 that is in fluid communication with the fluid main 170 and the secondary fluid loop 525 to transfer heat from the secondary fluid loop 525 to the second suction main 140 in the second refrigerant circuit 520.

The low temperature secondary fluid loop 530 includes the low temperature display cases 100, a second pump 550, and a second chiller 555. The second pump 550 is positioned in the secondary fluid loop 530 to direct refrigerant between the low temperature display cases 100 and the second chiller 555. The second chiller 555 includes a heat exchanger 560 that is in fluid communication with the fluid main 170 and the secondary fluid loop 530 to transfer heat from the secondary fluid loop 530 to the first suction main 135 in the second refrigerant circuit 520.

Figure 7:
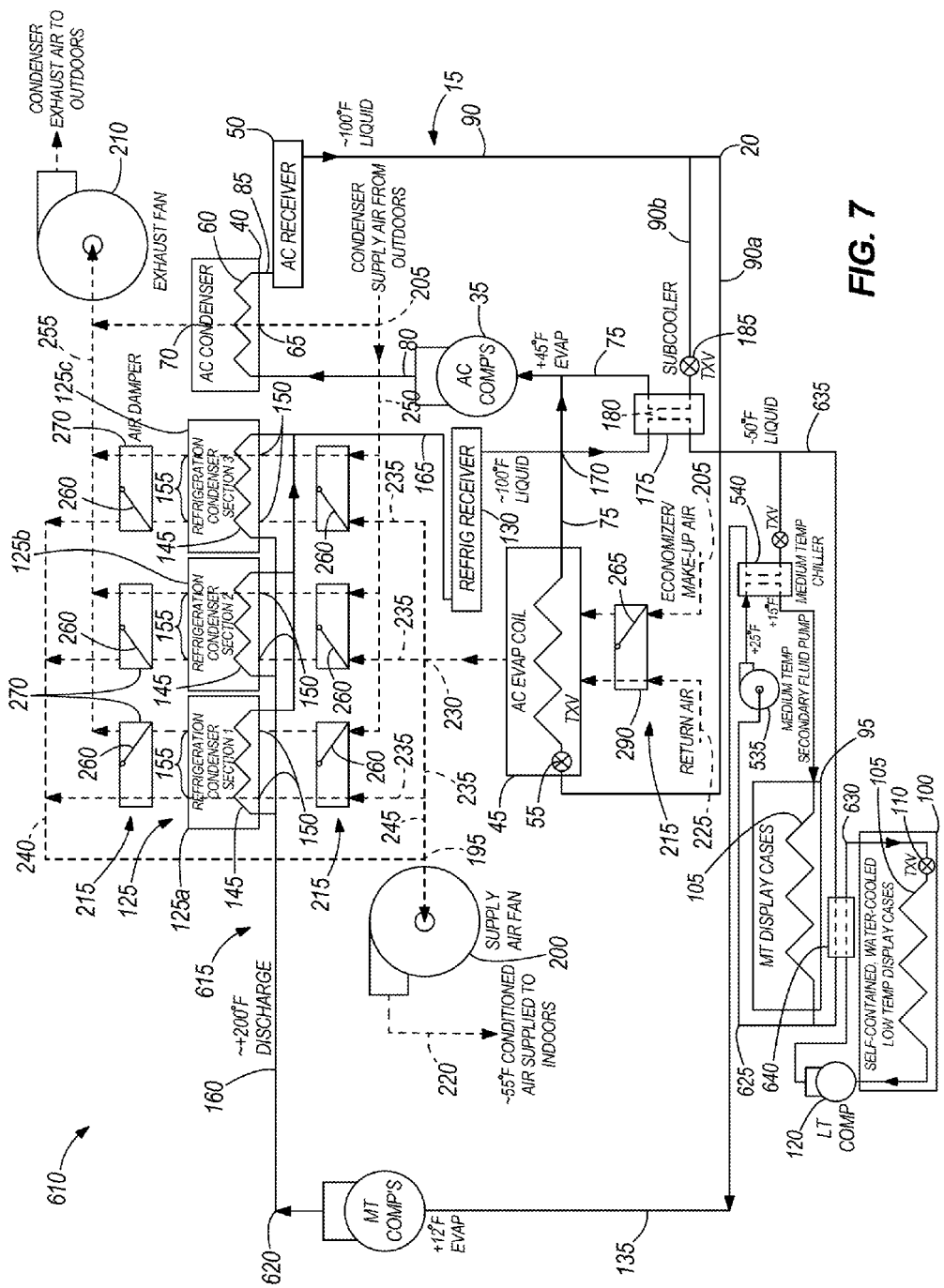
FIG. 7 is a schematic view of another construction of an integrated HVACR system embodying the invention.

FIG. 7 shows another construction of an HVACR system 610 for use with a commercial setting and embodying the invention. Except as described below, the HVACR system 610 is the same as the HVACR system 10 described with regard to FIG. 1, and common elements are given the same reference numerals.

As illustrated in FIG. 7, the HVACR system 610 includes the HVAC sub-system 15 and a refrigeration sub-system 615 defining a second refrigerant circuit 620. The second refrigerant circuit 620 is similar to the second refrigerant circuit 520 described with regard to FIG. 6, except the second refrigerant circuit 620 does not include the low temperature compressor assembly 120 or the first suction main 135.

The refrigeration sub-system 615 includes a medium temperature secondary fluid loop 625 that has the medium temperature display cases 95, and a self-contained low temperature secondary fluid loop 630 that has the low temperature display cases 100. The medium temperature secondary fluid loop defines a coolant loop that is separate from and in heat exchange relationship with the second refrigerant circuit 620 similar to the medium temperature secondary fluid loop 525 described with regard to FIG. 6. The medium temperature secondary fluid loop includes the medium temperature display cases 95, the pump 535, the chiller 540, and a bifurcated fluid main 635 that directs refrigerant to the medium temperature display cases 95 and to the low temperature secondary fluid loop 630.

The low temperature secondary fluid loop 630 defines a water or glycol coolant loop that is separate from the second refrigerant circuit 620 and the medium temperature secondary fluid loop 625. In addition to the low temperature display cases 100, the low temperature secondary fluid loop 630 includes the low temperature compressor assembly 120 and a heat exchanger 640 that is in heat exchange relationship with the medium temperature secondary fluid loop 625 to transfer heat from the low temperature secondary fluid loop 630 to the medium temperature secondary fluid loop 625. In this manner, the heat exchanger 640 acts as a condenser for the low temperature secondary fluid loop 630, and acts as an expansion valve for the medium temperature secondary fluid loop 625.

FIGS. 1-3 and 5-7 show different exemplary HVAC sub-systems and refrigeration sub-systems that embody the invention. As one of ordinary skill in the art will recognize, other HVAC sub-system and refrigeration sub-system arrangements not specifically discussed are possible and considered herein.

FIGS. 8-11 show the airflow management system of FIGS. 1-3 and 5-7 in different operating modes or stages of control based on the desired conditioning for the commercial setting and the conditions of the outside environment. Although operation of the HVACR system 10 is described in detail below, one of ordinary skill in the art will recognize that the operation of the HVACR systems 410, 510, and 610 is similar to the operation of the HVACR system 10. Also, although different modes of the HVACR system 10 are discussed below, various other operating modes of the HVACR system 10 are possible and considered herein.

The positions of the first air dampers 260 determine whether heat from the refrigerant in the refrigeration sub-system 25 is fully rejected to the outside environment, partially rejected to the outside environment and partially rejected to the air in the first airflow circuit 195 (i.e., heat reclaim), or fully rejected to the air in the first airflow circuit 195. Also, the position of the second air damper 265 determines whether the air in the return air section 225 enters the evaporator 45, whether a portion of the airflow in the return air section 225 and a portion of ambient air in the second airflow circuit 205 enters the evaporator 45, or whether only ambient air from the second airflow circuit 205 enters the evaporator 45.

Figure 8:
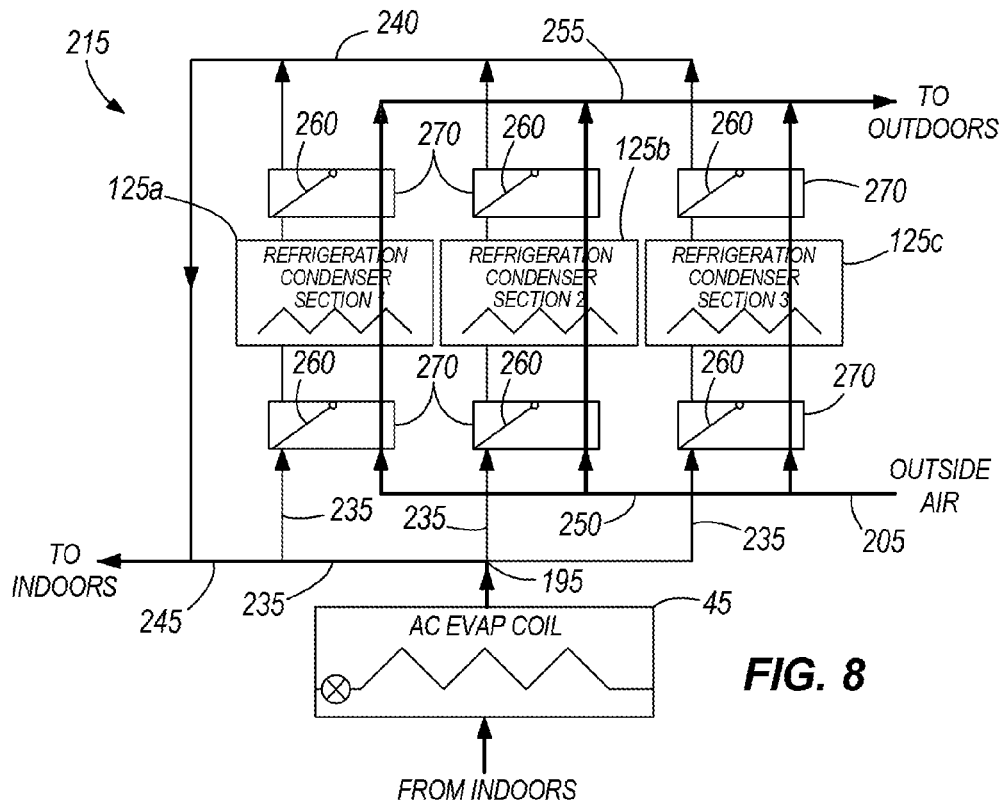
FIG. 8 is a schematic view of a portion of the HVACR system of FIGS. 1 and 5-7 in a heat rejection mode.

For example, FIGS. 2, 3, and 8 show the HVACR system 10 in a heat rejection mode (e.g., when the outside environment has a high air temperature—a hot day). With reference to FIGS. 1-3 and 8, the first air dampers 260 associated with the condensers 125a, 125b, 125c are in the first position 275, and the second air damper 265 is in the first position 295 or the third position 305. As a result, ambient air within the second airflow circuit 205 is routed through each of the condensers 125a, 125b, 125c via the ambient air inlet 250 to reject heat from the refrigerant in the refrigeration sub-system 25 to the outside environment via the ambient air outlet 255. Also, the first air dampers 260 inhibit airflow from the first airflow circuit 195 through the condensers 125a, 125b, 125c when the dampers 260 are in the first position 275. Instead, the airflow in the air conditioning section 225 exiting the evaporator 45 is directed to the bypass portion 245 before being circulated into the indoor environment via the supply air section. In this construction, heat from the refrigerant in the refrigeration sub-system 25 is only rejected to the outside environment (i.e., no heat reclaim).

Figure 9:
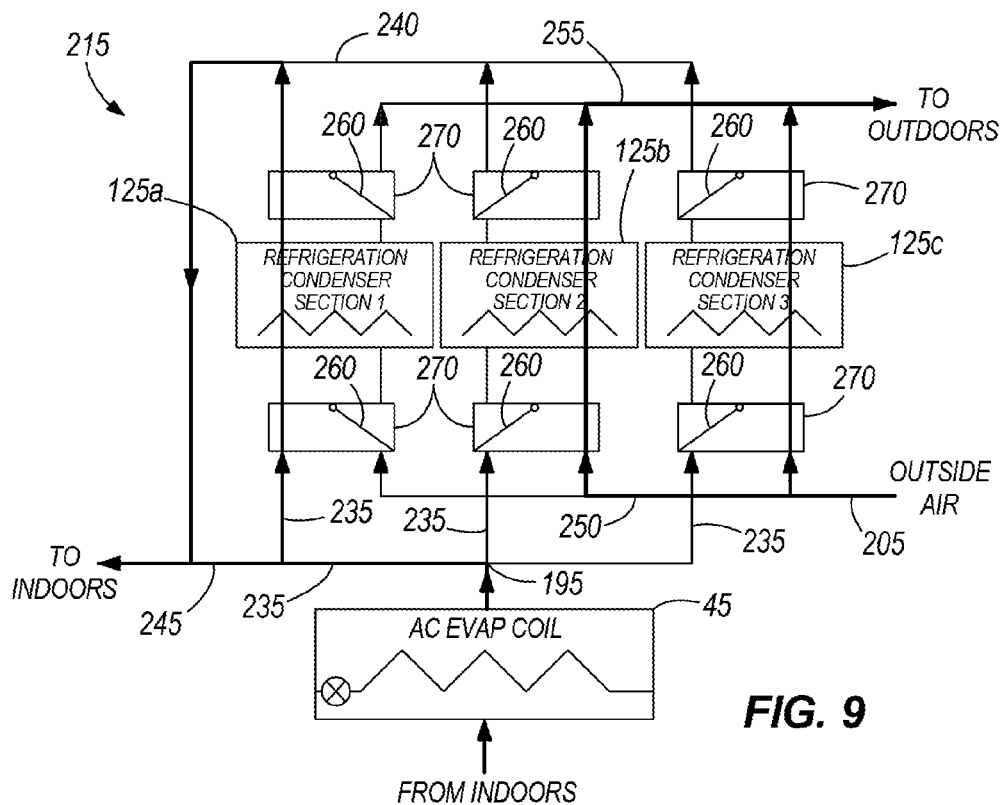
FIG. 9 is a schematic view of a portion of the HVACR system of FIGS. 1 and 5-7 in a first reheat mode.

FIGS. 1, 5-7, and 9 show the HVACR system 10 in a first reheat mode (e.g., when the outside environment has a moderately high air temperature—a warm day) in which some dehumidification of the indoor environment is desired. The first air dampers 260 associated with the condenser 125a are in the second position 280, and the first air dampers 260 associated with the condensers 125b, 125c are in the first position 275. The second air damper 265 is in the first position 295 or the third position 305. Thus, ambient air within the second airflow circuit 205 is routed through the condensers 125b, 125c via the ambient air inlet 250 to reject heat from the refrigerant in the refrigeration sub-system 25 to the outside environment via the ambient air outlet 255. The dehumidified airflow within the first airflow circuit 195 exiting the evaporator 45 is directed through the inlet portion 235 to the air inlet 150 of the condenser 125a to reheat the airflow via heat reclaim prior to directing the dehumidified, cool air to the indoor environment via the outlet portion 240. As illustrated in FIG. 9, some of the dehumidified, cool airflow exiting the evaporator 45 flows directly to the supply air section 220 via the bypass portion 245.

Figure 10:
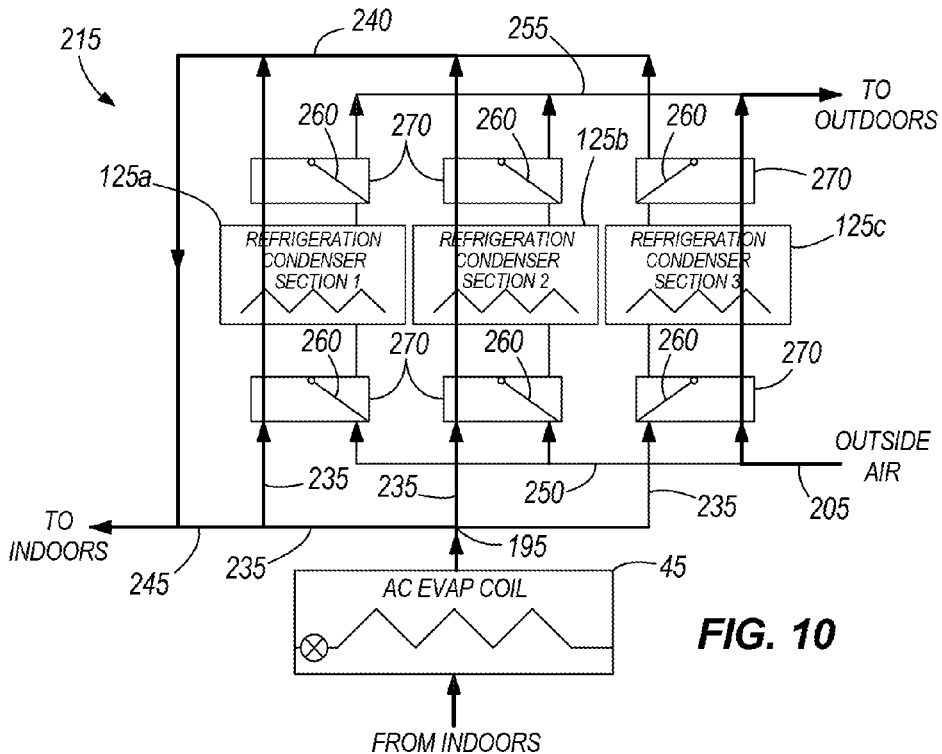
FIG. 10 is a schematic view of a portion of the HVACR system of FIGS. 1 and 5-7 in a second reheat mode.

FIG. 10 shows the HVACR system 10 in a second reheat mode (e.g., when the outside environment has a moderately low air temperature—a cool day) in which substantial dehumidification and some heating of the indoor environment is desired. With reference to FIGS. 1, 5-7, and 10, the first air dampers 260 associated with the condensers 125a, 125b are in the second position 280, and the first air dampers 260 associated with the condenser 125c are in the first position 275 such that most of the airflow in the first airflow circuit 195 is directed through the second condenser assembly 125 for heat reclaim using heat from the refrigerant in the second refrigerant circuit 30. The second air damper 265 is in the first position 295 or the third position 305. Ambient air within the second airflow circuit 205 is routed through the condenser 125c via the ambient air inlet 250 to reject heat from the refrigerant in the refrigeration sub-system 25 to the outside environment via the ambient air outlet 255. The dehumidified airflow within the first airflow circuit 195 exiting the evaporator 45 is directed through the inlet portion 235 to the inlets of the condensers 125a, 125b to reheat the airflow via heat reclaim. In this construction, the airflow exiting the evaporator 45 is not cooled (i.e., no cooling is provided by the HVAC sub-system 15). The reheated air exiting the condensers 125a, 125b is directed to the indoor environment via the outlet portion 240. As illustrated, some air exiting the evaporator 45 is directed through the bypass portion 245 to the supply air section 220. In some constructions (e.g., extremely cold climates), supplemental heating may be needed to adequately heat the indoor environment.

Figure 11:
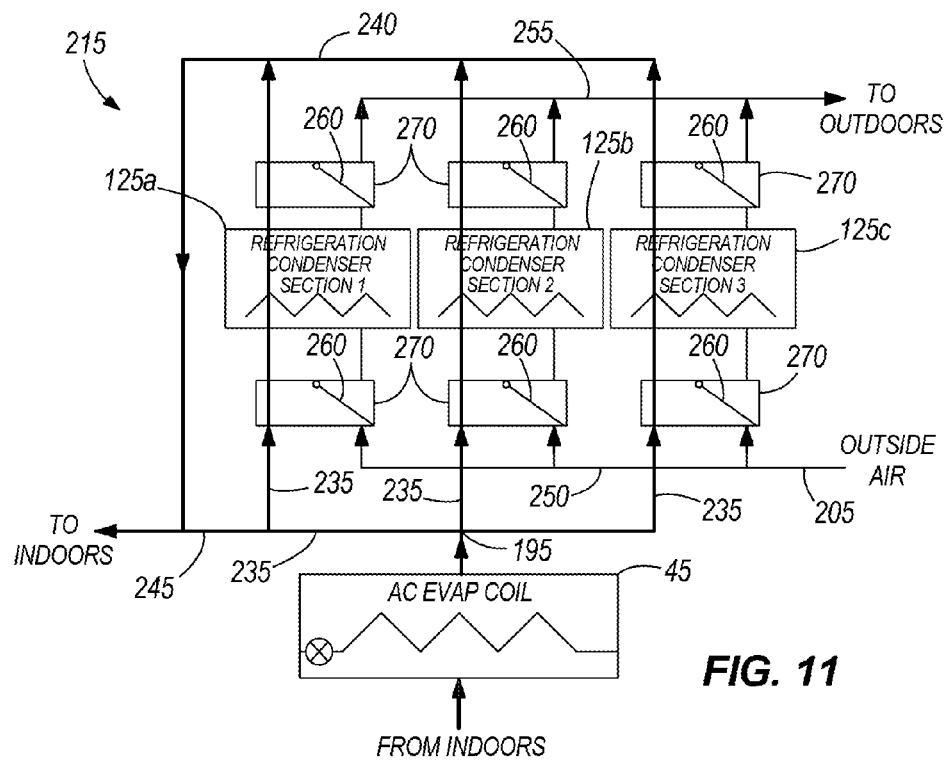
FIG. 11 is a schematic view of a portion of the HVACR system of FIGS. 1 and 5-7 in a heat mode.

FIG. 11 shows the HVACR system 10 in a heat mode (e.g., when the outside environment has a substantially low air temperature—a cold day) in which substantial heating of the indoor environment is desired. With reference to FIGS. 1, 5-7, and 11, the first air dampers 260 associated with all the condensers 125a, 125b, 125c are in the second position 280. In constructions of the HVACR system 10 including more than three condensers, fewer than all the first air dampers 260 may be in the second position 280 depending on the heating desired in the indoor environment. The second air damper 265 is in the first position 295 or the third position 305. In this construction, heat from the refrigeration sub-system 25 is fully utilized to reheat the airflow directed toward the indoor environment. In particular, the airflow within the first airflow circuit 195 exiting the evaporator 45 is directed through the inlet portion 235 to the air inlets 150 of the condensers 125a, 125b, 125c to reheat the airflow via heat reclaim. In this construction, the airflow exiting the evaporator 45 is not cooled (i.e., no cooling is provided by the HVAC sub-system 15). The reheated air is directed from the air outlets 155 of the condensers 125a, 125b, 125c to the indoor environment via the outlet portion 240. As illustrated, some air exiting the evaporator 45 is directed through the bypass portion 245 to the supply air section 220.

FIG. 12 shows the status of the compressor assembly 35, the medium temperature compressor assembly 115, the low temperature compressor assembly 120, the supply blower 200, the exhaust blower 210, and the first air dampers 260 corresponding to various operating modes of the HVACR system 10. With reference to FIGS. 2 and 3, the HVACR system 10 can include a cooling/refrigeration mode (see e.g., FIGS. 2, 3, and 8), a heating/refrigeration mode, an economizer-cooling/refrigeration mode, a cooling-space exhaust/refrigeration mode (see e.g., FIGS. 2, 3, and 9), a cooling-dehumidification-reheat/refrigeration mode, an exhaust/refrigeration mode, or any other possible combination of refrigeration and cooling, heating, dehumidification, exhaust, and economizer modes of the HVACR system 10 (see e.g., compound modes 1, 2, or 3 illustrated in FIG. 12).

The HVACR system 10 integrates the interchange of energy between the HVAC sub-system 15 and the refrigeration sub-system 25 using variable-position air dampers 260, 265. The control system 325 utilizes the air damper system 215 to manage the energy of the HVAC sub-system 15 and the refrigeration sub-system 25 to meet the air conditioning and refrigeration needs of the commercial setting. The different airflow paths provided by the first and second air damper 260, 265 allows a series of distinct operational modes of the HVACR system 10 that manage energy transfer between the HVAC sub-system 15 and the refrigeration sub-system 25 based on the air conditioning desired in the indoor environment and the conditions of the outside environment.

The subcooling apparatus 175 positioned between the HVAC sub-system 15 and the refrigeration sub-system 25 provides the necessary refrigerant cooling for the medium temperature display cases 95 and the low temperature display cases 100. In the construction of the HVAC systems 10, 510, 610 illustrated in FIGS. 1, 6, and 7, the refrigerant in the HVAC sub-system 15 subcools the refrigerant in the respective refrigeration sub-systems 25, 515, 615.

The HVACR system 10 combines air conditioning, dehumidification, heating, and refrigeration functions into a single, integrated unit that utilizes the energy of the refrigeration sub-system 25 to simultaneously condition the indoor environment associated with the HVAC sub-system 15 and condition the encloses spaces associated with the refrigeration sub-system 25. Specifically, only the energy that would otherwise be rejected from the second condenser assembly 125 to the outside environment is used to condition the airflow in the first airflow circuit 195 based on the desired conditions of the indoor environment. Also, the HVACR system 10 can incorporate modular units (e.g., evaporator section 310, condenser assembly section 315, compressor assembly section 320) to manage refrigerant routing and airflow control within the respective sub-systems 15, 25 to minimize refrigerant charge and energy use and to maximize the locations inter-related components of the HVACR system 10.

The integrated electronic control system 325 combines the electronic and electro-mechanical controls of the HVAC sub-system 15 and the refrigeration sub-system 25 into a unitary control setup that manages the functions of both the HVAC and refrigeration sub-systems 15, 25. The unitary control system 325 utilizes control algorithms that coordinate operation of the HVACR system 10 to minimize the energy used by the HVACR system 10.

Various features and advantages of the invention are set forth in the following claims.

The invention claimed is:

1. A combined heating, ventilation, air conditioning, and refrigeration ("HVACR") system comprising:
   a heating, ventilation, and air conditioning ("HVAC") sub-system in communication with an open space of an indoor environment, the HVAC sub-system including a first condenser, a first evaporator, and a first compressor arranged in series with each other and at least partially defining a first refrigerant circuit circulating a first refrigerant for selectively conditioning an airflow within the HVAC sub-system, the airflow directed to the indoor environment to condition the open space; and a refrigeration sub-system in communication with an enclosed space within the indoor environment, the refrigeration sub-system including a second condenser, a second evaporator, and a second compressor arranged in series with each other and at least partially defining a second refrigerant circuit circulating a second refrigerant for selectively conditioning the enclosed space, wherein heat from the second refrigerant is selectively transferred to the airflow within the second condenser to reheat the airflow prior to the airflow being discharged into the open space.

2. The HVACR system of claim 1, further comprising an airflow management system including an airflow circuit circulating the airflow and an air damper system in communication with the airflow circuit to selectively direct at least a portion of the airflow through the second condenser.

3. The HVACR system of claim 2, wherein the air damper system includes an air damper to control the airflow through the second condenser such that heat from the second refrigerant within the second condenser can be fully rejected to an ambient environment, partially rejected to the ambient environment and partially rejected to the airflow, or fully rejected to the airflow.

4. The HVACR system of claim 3, wherein the airflow circuit includes a bypass portion to bypass at least some of the airflow around the second condenser without passing through the second condenser.

5. The HVACR system of claim 4, wherein the air damper is step-wise movable between the first position and the second position.

6. The HVACR system of claim 3, wherein the air damper is movable between a first position and a second position to selectively control a source of the airflow through the second condenser, and wherein the source includes at least one of supply air and ambient air.

7. The HVACR system of claim 6, wherein the air damper is further movable to a third position between the first position and the second position.

8. The HVACR system of claim 3, wherein the refrigeration sub-system includes two second condensers, and wherein at least a portion of the airflow is selectively directed through at least one of the second condensers.

9. The HVACR system of claim 8, wherein a portion of the airflow is directed to the indoor environment without being directed through the second condensers.

10. The HVACR system of claim 8, wherein the air damper system includes a first air damper associated with one of the second condensers and a second air damper associated with the other of the second condensers, and wherein each of the first air damper and the second air damper has a first position and a second position.

11. The HVACR system of claim 3, wherein the air damper is a first air damper associated with the second condenser, and wherein the air damper system further includes a second air damper associated with the first evaporator to selectively control the airflow through the first evaporator such that a source of the airflow entering the first evaporator includes one or more of return air, makeup air, and ambient air.

12. The HVACR system of claim 11, wherein the first air damper is located adjacent one of an inlet and an air outlet of the second condenser and the second air damper is located adjacent an air inlet of the first evaporator.

13. The HVACR system of claim 12, wherein the first air damper is located adjacent the air inlet, the HVACR system further comprising a third air damper located adjacent an air outlet of the second condenser.

14. A combined heating, ventilation, air conditioning, and refrigeration ("HVACR") system comprising:

a modular evaporator section in communication with an open space of an indoor environment, the evaporator section including an evaporator and a first air moving device positioned to direct air through the evaporator and toward the open space;

a modular condenser section selectively in communication with the indoor environment and an ambient environment, the condenser section including a condenser and a second air moving device positioned to direct air through the condenser;

an air damper system including a plurality of air dampers positioned to control airflow between the indoor environment, the ambient environment, and the evaporator section and the condenser section; and a heating, ventilation, and air conditioning ("HVAC") sub-system in communication with the open space of the indoor environment and defining a first refrigerant circuit, and a refrigeration sub-system in communication with an enclosed space within the indoor environment and defining a second refrigerant circuit, wherein the condenser is associated with the refrigeration sub-system and partially defines the second refrigerant circuit, and wherein the airflow through the condenser is associated with one or both of the ambient environment and the HVAC sub-system.

15. The HVACR system of claim 14, wherein the condenser section is proximate to the evaporator section.

16. The HVACR system of claim 15, wherein a partition separates the condenser section from the evaporator section.

17. The HVACR system of claim 14, wherein the evaporator section and the condenser section are located on a rooftop.

18. The HVACR system of claim 14, wherein the air damper system includes a first air damper located adjacent an inlet to the evaporator section to control airflow through the evaporator, and a second air damper located adjacent one of an inlet and an outlet of the condenser section to control airflow through the condenser section.

19. The HVACR system of claim 18, wherein the second air damper is located adjacent the inlet to the condenser section, and wherein the air damper system further includes a third air damper located adjacent the outlet of the condenser section to control the airflow through the condenser section.

20. The HVACR system of claim 19, wherein the second air damper is movable between a first position and a second position to selectively control a source of the airflow through the condenser section, and wherein the third air damper is movable between a first position and a second position to selectively control a destination of the airflow.

21. The HVACR system of claim 20, wherein the source of the airflow through the condenser section includes at least one of ambient air and supply air from the evaporator section, and wherein the destination of the airflow includes at least one of the indoor environment and the ambient environment.

22. The HVACR system of claim 19, wherein the first air damper is movable between a first position and a second position to selectively control a source of the airflow through the evaporator section, and wherein the source of the airflow includes at least one of return air, makeup air, and ambient air.

23. The HVACR system of claim 14, wherein each of the plurality of air dampers is step-wise movable between a first position and a second position to control airflow through one or both of the evaporator section and the condenser section.

24. The HVACR system of claim 14, wherein one of the plurality of dampers is located adjacent the condenser section to control the airflow through the condenser such that heat from refrigerant within the condenser can be fully rejected to the ambient environment, partially rejected to the ambient environment and partially rejected to the airflow through the condenser section, or fully rejected to the airflow through the condenser section.

25. The HVACR system of claim 14, wherein the condenser is a first condenser, the condenser section further including a second condenser associated with the HVAC sub-system and partially defining the first refrigerant circuit, wherein one air damper of the plurality of air dampers is positioned adjacent an inlet to the condenser section and another air damper of the plurality of air dampers is positioned adjacent an outlet to the condenser section to control the airflow through the first condenser and the second condenser.

* * * * *